United States Patent
Lee et al.

(10) Patent No.: US 8,445,814 B2
(45) Date of Patent: May 21, 2013

(54) SUBSTRATE CUTTING APPARATUS AND METHOD OF CUTTING SUBSTRATE USING THE SAME

(75) Inventors: Hyun-Chul Lee, Yongin (KR); Gyoo-Wan Han, Yongin (KR); Jong-Dae Kim, Yongin (KR); Jin-Han Park, Yongin (KR); Joon-Hyung Kim, Yongin (KR); Hyung-Sik Kim, Yongin (KR); In-Su Choi, Yongin (KR); Yong-Jin Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 328 days.

(21) Appl. No.: 12/731,305

(22) Filed: Mar. 25, 2010

(65) Prior Publication Data
US 2010/0243627 A1 Sep. 30, 2010

(30) Foreign Application Priority Data
Mar. 25, 2009 (KR) ........................ 10-2009-0025452

(51) Int. Cl.
*B23K 26/00* (2006.01)
*B23K 26/14* (2006.01)
*B23K 26/16* (2006.01)

(52) U.S. Cl.
USPC ............ 219/121.72; 219/121.67; 219/121.68; 219/121.69; 219/121.85

(58) Field of Classification Search
USPC ............. 219/121.67, 121.68, 121.69, 121.72, 219/121.85
See application file for complete search history.

(56) References Cited

U.S. PATENT DOCUMENTS

| | | | | |
|---|---|---|---|---|
| 5,254,833 A | * | 10/1993 | Okiyama | 219/121.68 |
| 5,570,384 A | * | 10/1996 | Nishida et al. | 372/19 |
| 5,589,090 A | * | 12/1996 | Song | 219/121.62 |
| 5,690,845 A | * | 11/1997 | Fuse | 219/121.74 |
| 5,728,089 A | * | 3/1998 | Lal et al. | 606/1 |
| 5,902,368 A | * | 5/1999 | Witzmann et al. | 65/105 |
| 6,007,756 A | * | 12/1999 | Weiteder et al. | 264/400 |
| 6,114,801 A | * | 9/2000 | Tanaka et al. | 310/365 |
| 6,207,925 B1 | * | 3/2001 | Kendall | 219/121.63 |
| 6,236,446 B1 | * | 5/2001 | Izumi et al. | 349/187 |
| 6,437,284 B1 | * | 8/2002 | Okamoto et al. | 219/121.73 |
| 6,512,196 B1 | * | 1/2003 | Yoon et al. | 219/121.67 |
| 6,529,264 B1 | * | 3/2003 | Ikeda | 355/53 |

(Continued)

FOREIGN PATENT DOCUMENTS
CN 1541800 11/2004
JP 57-181787 11/1982
(Continued)

OTHER PUBLICATIONS

U.S. Appl. No. 12/731,410, filed Mar. 25, 2010, Hyun-Chul Lee et al., Samsung Moblie Display Co., Ltd.

*Primary Examiner* — Ida M Soward
(74) *Attorney, Agent, or Firm* — Lee & Morse, P.C.

(57) ABSTRACT

A substrate cutting apparatus includes a stage configured to support a substrate to be cut along a virtual cutting line, a laser generator configured to emit an ultraviolet (UV)-based laser beam for cutting the substrate by removing part of the substrate along the cutting line, and a beam oscillator disposed on a beam path of the laser beam and configured to perform a beam swing on the laser beam in a direction parallel to the length direction of the cutting line by oscillating a tilt angle of the laser beam toward the cutting line.

20 Claims, 5 Drawing Sheets

U.S. PATENT DOCUMENTS

| | | | |
|---|---|---|---|
| 6,629,342 B1 * | 10/2003 | Tanaka et al. | 29/25.35 |
| 6,770,544 B2 * | 8/2004 | Sawada | 438/462 |
| 7,015,118 B2 | 3/2006 | Wakayama | |
| 7,169,688 B2 * | 1/2007 | Liu | 438/463 |
| 7,388,172 B2 * | 6/2008 | Sercel et al. | 219/121.72 |
| 7,423,237 B2 * | 9/2008 | Kusama et al. | 219/121.72 |
| 7,601,616 B2 | 10/2009 | Morikazu et al. | |
| 7,605,058 B2 * | 10/2009 | Nakamura | 438/464 |
| 7,633,034 B2 * | 12/2009 | Bruland et al. | 219/121.68 |
| 7,638,729 B2 | 12/2009 | Park | |
| 7,649,157 B2 * | 1/2010 | Iizuka | 219/121.82 |
| 7,767,555 B2 * | 8/2010 | Park | 438/463 |
| 7,804,043 B2 | 9/2010 | Deshi | |
| 7,838,796 B2 * | 11/2010 | Furui | 219/121.72 |
| 7,845,063 B2 * | 12/2010 | Kawashima | 29/594 |
| 7,887,712 B2 * | 2/2011 | Boyle et al. | 216/65 |
| 7,947,920 B2 * | 5/2011 | Van Borkulo et al. | 219/121.68 |
| 8,091,189 B2 * | 1/2012 | Kawashima | 29/25.35 |
| 8,108,998 B2 | 2/2012 | Inada et al. | |
| 2003/0034093 A1 | 2/2003 | Morris et al. | |
| 2006/0079040 A1 * | 4/2006 | Tanaka et al. | 438/166 |
| 2007/0164072 A1 | 7/2007 | Nishio | |
| 2007/0228616 A1 | 10/2007 | Bang | |
| 2007/0284345 A1 * | 12/2007 | Ando et al. | 219/121.67 |
| 2008/0035617 A1 | 2/2008 | Fu et al. | |
| 2008/0061043 A1 * | 3/2008 | Fujii | 219/121.69 |
| 2008/0286943 A1 | 11/2008 | Nishio | |
| 2008/0305615 A1 * | 12/2008 | Ueno et al. | 438/463 |
| 2009/0046757 A1 * | 2/2009 | Miyairi et al. | 372/101 |
| 2009/0219499 A1 * | 9/2009 | Yamaguchi et al. | 355/67 |
| 2009/0230102 A1 * | 9/2009 | Soyama | 219/121.69 |

FOREIGN PATENT DOCUMENTS

| | | |
|---|---|---|
| JP | 02194352 A * | 7/1990 |
| JP | 06-039572 A | 2/1994 |
| JP | 11-021141 | 1/1999 |
| JP | 2001-321978 | 11/2001 |
| JP | 2005-212364 | 8/2005 |
| JP | 2005-314127 | 11/2005 |
| JP | 2006-162877 A | 6/2006 |
| JP | 2008-080346 | 4/2008 |
| JP | 2008-132616 | 6/2008 |
| KR | 10 2000-0050910 A | 8/2000 |
| KR | 20-0262793 Y1 | 1/2002 |
| KR | 10-0347955 B1 | 7/2002 |
| KR | 10-0675535 B1 | 1/2007 |
| TW | 578266 | 3/2004 |
| WO | WO-03013816 A1 | 2/2003 |
| WO | WO-2004-002705 A1 | 1/2004 |

\* cited by examiner

SUBSTRATE CUTTING APPARATUS AND METHOD OF CUTTING SUBSTRATE USING THE SAME

RELATED APPLICATIONS

This application claims the benefit of Korean Patent Application No. 10-2009-0025452 filed on Mar. 25, 2009, in the Korean Intellectual Property Office, the contents of which are incorporated herein by reference in their entirety.

BACKGROUND

1. Field

Aspects of the described technology relate generally to a substrate cutting apparatus and a method of cutting a substrate using the same. More particularly, aspects of the described technology relate generally to a substrate cutting apparatus and a method of cutting a substrate using the same, which are capable of effectively and stably cutting a glass substrate using a laser beam.

2. Description of the Related Art

A substrate cutting apparatus is used to cut a flat panel display, using a glass-based substrate as a base substrate, into a desired product size. Examples of a flat panel display include an organic light emitting diode (OLED) display, a liquid crystal display (LCD), and so on. The flat panel display is advantageous in that it can be made thin, and a demand for increasingly thin displays has been gradually increasing. In recent years, there has been an increasing demand for a flat panel display using a relatively very thin glass substrate having a thickness of 0.3 mm or less.

In general, a substrate cutting apparatus is equipped with a $CO_2$ laser (i.e., an infrared-based laser) and a cooling device to cut a transparent glass substrate. The substrate cutting apparatus is configured to instantly heat the glass substrate along a line that will be cut using the $CO_2$ laser, thereby generating compression stress caused by the heat, and to instantly cool the heated portion using the cooling device, thereby generating tensile stress. If such a heat impact is applied to the glass substrate, a micro-crack is generated in the glass substrate, thereby causing the glass substrate to be cut.

However, a decrease in the thickness of the glass substrate makes it difficult to stably cut the glass substrate by smoothly generating a crack due to stress caused by a difference in the temperature. This is the same principle whereby a thin glass cup is rarely broken even by hot water. Accordingly, a conventional substrate cutting apparatus is problematic in that it cannot easily cut a flat panel display using a relatively very thin glass substrate in line with the demand for increasingly thin displays.

The above information disclosed in this Background section is only for enhancement of understanding of the background of the described technology, and may include information that was not known in this country to others before the applicants made their invention, and thus does not constitute prior art.

SUMMARY

The described technology has been made in an effort to provide a substrate cutting apparatus having an advantage that it can effectively and stably cut a substrate.

The invention further provides a substrate cutting method using the above substrate cutting apparatus.

According to an aspect of the invention, a substrate cutting apparatus is provided. The substrate cutting apparatus includes a stage to support a substrate to be cut along a virtual cutting line, a laser generator to emit an ultraviolet (UV)-based laser beam to cut the substrate by removing part of the substrate along the cutting line, and a beam oscillator disposed on a beam path of the laser beam, to oscillate a tilt angle of the laser beam toward the cutting line so as to perform a beam swing on the laser beam in a direction parallel to the length direction of the cutting line.

According to an aspect of the invention, the laser beam is subject to the beam swing within a predetermined beam irradiation section, and the beam irradiation section may have the same length direction as the cutting line and may be placed on the cutting line.

According to an aspect of the invention, the laser beam has a wavelength of 200 nm to 900 nm.

According to an aspect of the invention, the laser beam may be a pulse laser beam.

According to an aspect of the invention, the oscillated laser beam may physically remove the substrate within the beam irradiation section.

According to an aspect of the invention, the laser beam may have a unit irradiation time shorter than 50 ps (picoseconds).

According to an aspect of the invention, the laser beam may have a pulse frequency ranging from 0.1 MHz to 100 MHz.

According to an aspect of the invention, the substrate cutting apparatus further includes a transfer unit to transfer one or more of the beam oscillator and the stage in a direction parallel to the cutting line. The transfer unit may move the beam irradiation section along the cutting line.

According to an aspect of the invention, the beam oscillator may include a reflector to reflect the laser beam emitted from the laser generator and a driver to drive the reflector.

According to an aspect of the invention, the driver may selectively control a motion of the reflector so that a beam swing speed of the laser beam becomes uniform.

According to an aspect of the invention, the substrate cutting apparatus may further include a cleaning unit to clean a region cut by the laser beam.

According to an aspect of the invention, the substrate may have a thickness of 0.3 mm or less, and may be made of a glass-based material.

According to an aspect of the invention, the substrate cutting apparatus further includes an additional laser generator to emit an additional laser beam to heat part of the substrate on the cutting line toward which the oscillated laser beam will be oriented. The additional laser beam may be an infrared-based laser beam.

According to an aspect of the invention, a substrate cutting method is provided. The substrate cutting method includes mounting a substrate to be cut along a virtual cutting line on a stage, oscillating a tilt angle of a UV-based laser beam so as to beam swing a UV-based laser beam along the cutting line, and irradiating the oscillated laser beam along the cutting line so as to cut the substrate along the cutting line.

According to an aspect of the invention, the laser beam is subject to the beam swing within a predetermined beam irradiation section, and the beam irradiation section may have the same length direction as the cutting line and may be placed on the cutting line.

According to an aspect of the invention, the laser beam may have a wavelength of 200 nm to 900 nm.

According to an aspect of the invention, the oscillated laser beam may include a pulse laser beam and may physically remove the substrate within the beam irradiation section.

According to an aspect of the invention, the laser beam may have a unit irradiation time of shorter than 50 ps (picoseconds) and a pulse frequency ranging from 0.1 MHz to 100 MHz.

According to an aspect of the invention, the substrate cutting method further includes transferring one or more of the beam oscillator and the stage in a direction parallel to the cutting line. The beam irradiation section may move along the cutting line when one or more of the beam oscillator and the stage are transferred.

According to an aspect of the invention, the substrate cutting method further includes the step of irradiating an additional laser beam to the cutting line to which the oscillated laser beam will be irradiated so as to previously heat part of the substrate along the cutting line to which the oscillated laser beam will be irradiated. The additional laser beam may be an infrared-based laser beam.

Additional aspects and/or advantages of the invention will be set forth in part in the description that follows, and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings, of which.

DETAILED DESCRIPTION

Reference will now be made in detail to embodiments of the invention, examples of which are shown in the accompanying drawings, wherein like reference numerals refer to like elements throughout. The embodiments are described below in order to explain the invention by referring to the figures.

The size and thickness of each of the elements shown in the drawings is arbitrarily shown for better understanding and ease of description, and the invention is not necessarily limited thereto. In the drawings, the thickness of layers, films, panels, regions, etc., may be exaggerated for clarity. The thickness of the layers, films, panels, regions, etc., may be enlarged in the drawings for better understanding and ease of description. It will be understood that when an element such as a layer, film, region, or substrate is referred to as being "on" another element, it can be directly on the other element, or intervening elements may also be present.

Figure 1:
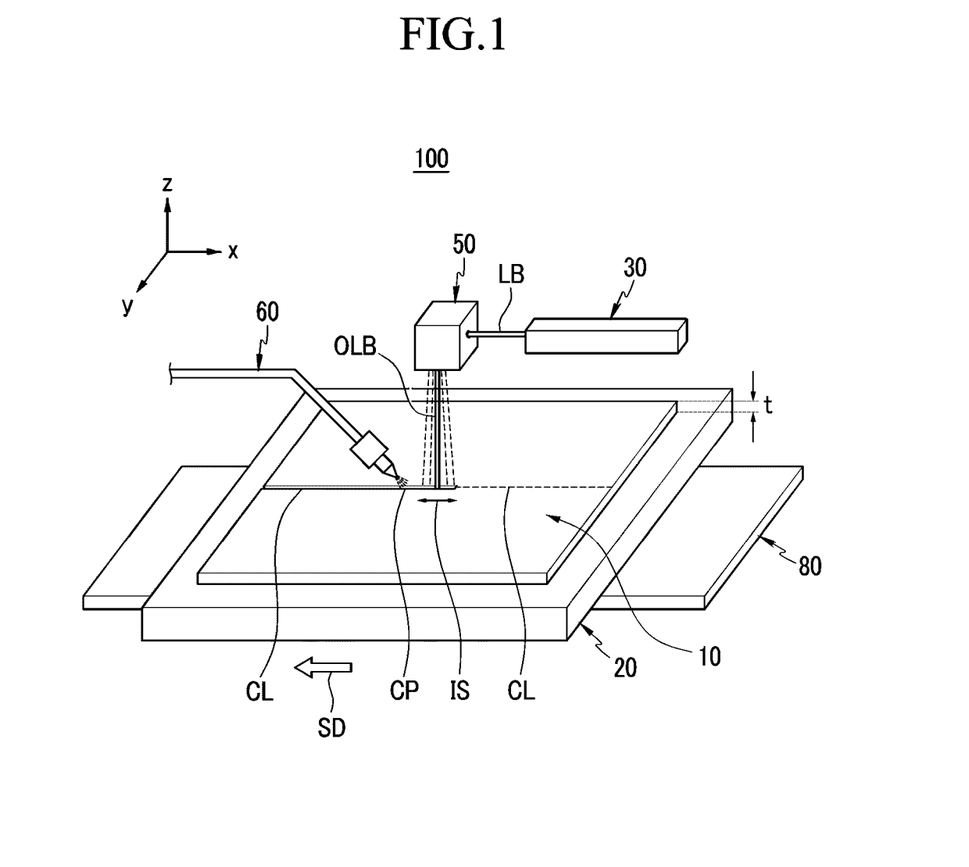
FIG. 1 is perspective view of a substrate cutting apparatus according to an aspect of the invention.

FIG. 1 shows a substrate cutting apparatus 100 according to an aspect of the invention. As shown in FIG. 1, the substrate cutting apparatus 100 includes a stage 20, a laser generator 30, a beam oscillator 50, and a transfer unit 80. The substrate cutting apparatus 100 may further include a cleaning unit 60.

The stage 20 supports a substrate 10 that will be cut along a virtual cutting line CL. For example, the substrate 10 may be a glass substrate made of a glass-based material. However, it is understood that the substrate 10 is not limited to the glass substrate, but may be a substrate made of a nonmetallic material rather than glass, or of any other suitable material. In FIG. 1, the cutting line CL indicated by a dotted line denotes a line to be cut, and the cutting line CL indicated by a solid line denotes a cut line.

The laser generator 30 emits a laser beam LB to cut the substrate 10 along the cutting line CL. An ultraviolet (UV)-based laser may be used as the laser generator 30, and the laser beam LB emitted from the laser generator 30 may have a wavelength of 200 nm to 900 nm, which includes both ultraviolet wavelengths and non-ultraviolet wavelengths. Further, the laser beam LB emitted from the laser generator 30 may be a pulse laser beam, and may have a unit irradiation time of shorter than 50 ps (picoseconds) and a pulse frequency of 0.1 MHz to 100 MHz. However, it is understood that other wavelengths, unit irradiation times, and frequencies may be used.

The beam oscillator 50 is disposed on a beam path of the laser beam LB that is emitted from the laser generator 30 and is then directed toward the cutting line CL by the beam oscillator 50. The beam oscillator 50 performs a beam swing on the laser beam LB by minutely oscillating a tilt angle of the laser beam LB to the substrate 10. The laser beam LB is subject to the beam swing within a predetermined irradiation section IS by the beam oscillator 50. The irradiation section IS has the same length direction as the cutting line CL, and it is placed on the cutting line CL. The tilt angle refers to an angle at which the oscillated laser beam OLB is incident on the surface of the substrate 10. In other words, what is meant by oscillating the tilt angle of the laser beam LB to the substrate 10 is that an angle at which the laser beam LB is incident on the substrate 10 is changed. Accordingly, an angle at which the oscillated laser beam OLB is incident on the surface of the substrate 10 varies within a predetermined range. Further, a direction in which the oscillated laser beam OLB is swung is parallel to the length direction of the cutting line CL and the irradiation section IS.

In FIG. 1, reference numeral OLB denotes the oscillated laser beam. As the laser beam OLB is beam-swung within the irradiation section IS reciprocatingly in a straight line, a portion of the substrate 10 struck by the laser beam OLB on the cutting line CL is gradually removed. A spot region where the laser beam OLB is instantly irradiated is reciprocated in a straight line within the irradiation section IS. The spot region refers to a point of the irradiation section IS at which the laser beam OLB is instantly irradiated. The laser beam OLB intermittently strikes one spot region within the irradiation section IS several tens to several thousands of times while being beam-swung. The laser beam OLB striking the substrate 10 physically removes a portion of the substrate 10 within the irradiation section IS by directly separating molecular bonds within the glass. When a portion of the substrate 10 is removed along the cutting line CL as described above, the substrate 10 is finally cut along the cutting line CL.

A substrate 10 that is several hundreds of micrometers in thickness and used as a substrate of a flat panel display cannot be easily and stably cut using a general UV-based laser beam LB that has not been beam-swung. If the laser beam LB of a high energy level is continuously irradiated on one spot region to cut the substrate 10 having a thickness of several hundreds of micrometers, a crack resulting from heat impact is likely to occur locally. The generated crack is not controlled and may be randomly formed in a direction intersecting the cutting line CL. The randomly formed crack may damage the edges of the substrate 10, which may cause weakening of the overall strength of the substrate 10. If the energy level of the laser beam LB that has not been beam-swung is lowered to prevent a crack from being generated, there is a possibility that a flaw can be formed in the substrate 10 having a thickness of several hundreds of micrometers, and it is difficult to cut the substrate 10.

In the example in FIG. 1, however, the laser beam OLB is beam-swung within the irradiation section IS and is intermittently irradiated on one spot region within the irradiation section IS. Accordingly, unnecessary cracks resulting from a heat impact can be prevented from being locally generated in the spot region, and so the energy level of the laser beam OLB to be irradiated on the substrate 10 can be increased. Consequently, the beam-swung UV-based laser beam OLB can stably cut the substrate 10 having a relatively large thickness.

Further, in the example in FIG. 1, the irradiation section IS where the oscillated laser beam OLB is irradiated has a length of about 100 mm or less. The oscillated laser beam OLB is swung within the irradiation section IS at a speed of about 0.1 m/s to 10 m/s by the beam oscillator 50. That is, a spot region where the laser beam OLB is instantly irradiated is reciprocated at a speed of about 0.1 m/s to 10 m/s in a straight line within the irradiation section IS. However, it is understood that the length of the irradiation section IS and the beam swing speed of the laser beam OLB are only exemplary, and other lengths and/or beam swing speeds may be used. In other words, the length of the irradiation section IS and the beam swing speed of the laser beam OLB can be properly controlled according to the energy level of the irradiated laser beam OLB to prevent cracks resulting from a heat impact from being generated near an incision surface of the cut substrate 10.

Figure 2:
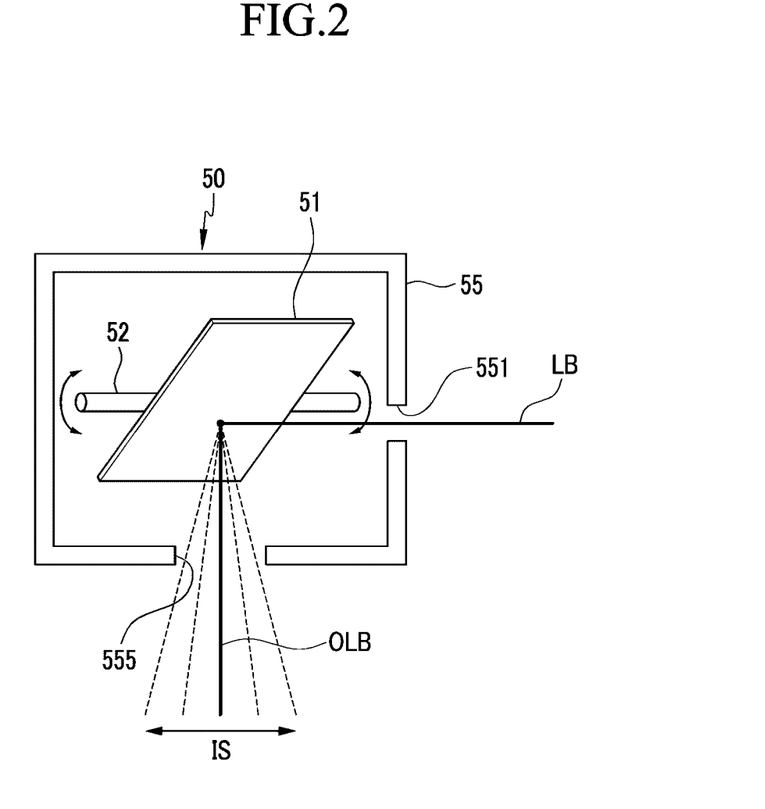
FIG. 2 is a schematic diagram of the beam oscillator of FIG. 1.

The beam oscillator 50, as shown in FIG. 2, includes a reflector 51 to reflect the laser beam LB emitted from the laser generator 30 and a driver 52 to drive the reflector 51. The driver 52 may further include other constituent elements, such as a motor and a controller, in addition to the constituent elements shown in FIG. 2. The driver 52 performs the beam swing on the laser beam LB, emitted from the laser generator 30, by controlling the motion of the reflector 51. The driver 52 may selectively control the motion of the reflector 51 so that the swing speed of the laser beam LB becomes uniform. That is, the driver 52 may selectively control the motion speed of the reflector 51 uniformly. As described above, the driver 52 can control a swing width and a swing speed of the laser beam OLB by controlling the motion of the reflector 51. Further, non-uniform regions, such as acceleration and deceleration sections resulting from the turning of a beam swing, can be shielded by a mask or a beam irradiation port 555 of a casing 55 to be described later. However, aspects of the invention are not limited thereto. For example, the beam swing speed of the laser beam OLB beam-swung by the beam oscillator 50 may not be uniform.

The beam oscillator 50 may further include a casing 55 accommodating the reflector 51 and the driver 52. The casing 55 includes a beam inflow port 551 to introduce the laser beam LB emitted from the laser generator 30 to the inside, and a beam irradiation port 555 to irradiate the laser beam OLB that is beam-swung by the reflector 51 and the driver 52 toward the substrate 10 (refer to FIG. 1). A swing width of the oscillated laser beam OLB can also be controlled through the size of the beam irradiation port 555.

Although not shown, the beam oscillator 50 may further include one or more lenses configured to enable the oscillated laser beam OLB to have a uniform focus within the irradiation section IS and disposed in the beam irradiation port 555.

Further, the beam oscillator 50 is not limited to the structure shown in FIG. 2. In other words, the beam oscillator 50 can perform the beam swing on the laser beam LB by minutely oscillating the tilt angle of the laser beam LB to the substrate 10 through a variety of optical methods.

Referring back to FIG. 1, the transfer unit 80 transfers the stage 20 in a direction parallel to the cutting line CL. In FIG. 1, reference numeral SD denotes a direction in which the transfer unit 80 transfers the stage 20. That is, the irradiation section IS can be moved along the cutting line CL by the transfer unit 80. However, the transfer unit 80 may move the beam oscillator 50 and the laser generator 30 rather than the stage 20. In other words, the transfer unit 80 may function to transfer the stage 20 or the beam oscillator 50 so that the irradiation section IS to which the laser beam OLB that is beam-swung by the beam oscillator 50 is irradiated moves along the cutting line CL.

The cleaning unit 60 removes unnecessary particles generated while the substrate 10 is cut by the oscillated laser beam OLB. The particles may cause generation of a fault, and may hinder the beam path of the laser beam LB. The cleaning unit 60 can remove the particles by jetting or absorbing the air. A cutting process can be performed more precisely and rapidly by the cleaning unit 60.

The substrate cutting apparatus 100 having the above construction can effectively and stably cut the substrate 10. The substrate cutting apparatus 100 can stably cut the substrate 10 made of a glass-based material of several hundreds of micrometers in thickness because it cuts the substrate 10 using a beam-swung UV-based laser beam OLB.

Further, the substrate cutting apparatus 100 can effectively and stably cut the substrate 10 having a relatively thin thickness of 0.3 mm or less because it does not adopt a method of cutting the substrate 10 using a crack generated by heat impact.

Hereinafter, a method of cutting the substrate 10 using the substrate cutting apparatus 100 of FIG. 1 is described. First, the substrate 10 that is made of a glass-based material having a thickness of about 0.1 mm to 0.3 mm and that will be cut along the cutting line CL is mounted on the stage 20. The thickness of the substrate 10 is not necessarily limited to 0.1 mm to 0.3 mm. Further, the substrate 10 is not necessarily made of a glass-based material, but may be made of nonmetallic materials other than glass.

While irradiating the UV-based laser beam OLB that is beam-swung by minutely oscillating a tilt angle of the laser beam OLB to the substrate 10 to the substrate 10 along the cutting line CL, the stage 20 is slowly transferred. The laser beam OLB is subject to the beam swing within the predetermined irradiation section IS. The irradiation section IS has the same length direction as the cutting line CL and moves along the cutting line CL.

The oscillated laser beam OLB has a wavelength of about 200 nm to 900 nm. Further, the oscillated laser beam OLB is a pulse laser beam, and has a unit irradiation time of shorter than 50 ps (picoseconds) and a pulse frequency ranging from 0.1 MHz to 100 MHz. The laser beam OLB physically removes the substrate 10 within the irradiation section IS. The above conditions should be satisfied in order for the oscillated laser beam OLB to physically remove the substrate 10 by directly separating molecular bonds within glass. As the stage 20 is transferred, the irradiation section IS is moved along the cutting line CL, so the substrate 10 is cut along the cutting line CL. The intensity of the laser beam LB, a speed at which the transfer unit 80 transfers the stage 20, etc., can be controlled by monitoring a degree in which part of the substrate 10 is removed and cut along the cutting line CL.

Next, the cleaning unit 60 removes unnecessary particles that occur while the substrate 10 is cut by the oscillated laser beam OLB and that may become a cause of a fault or hinder the beam path of the laser beam LB. The above substrate cutting method enables the substrate 10 to be more effectively and stably cut.

Figure 3:
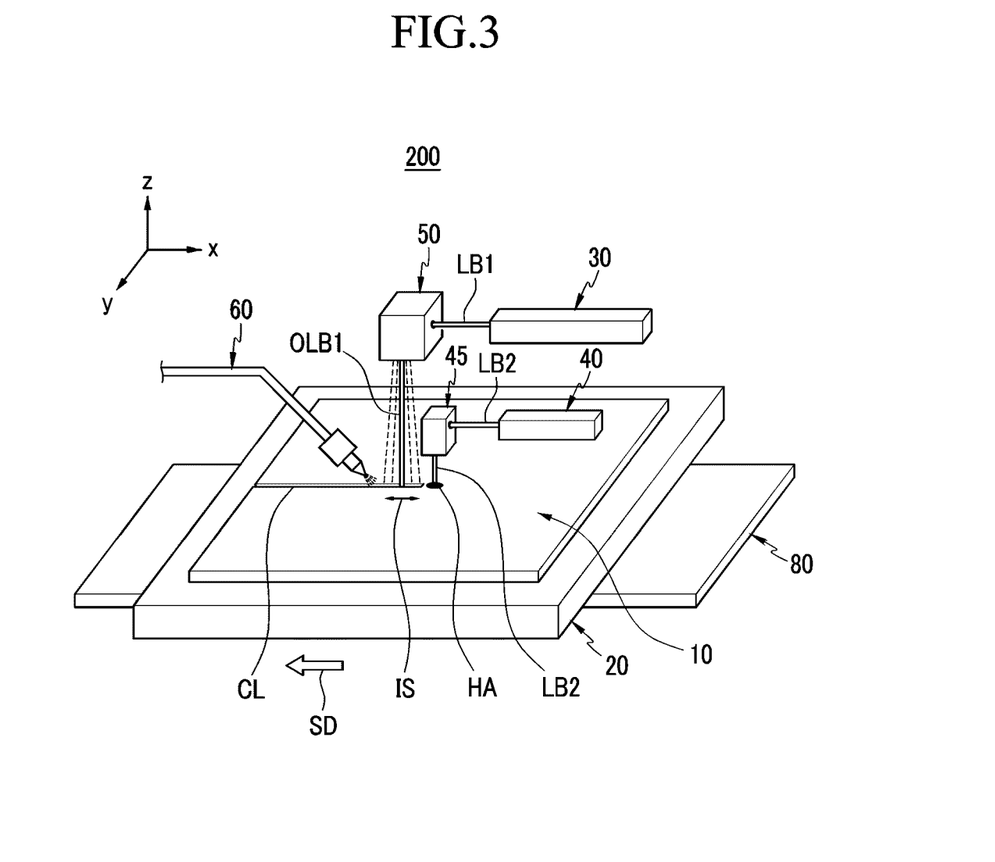
FIG. 3 is a perspective view of a substrate cutting apparatus according to an aspect of the invention.

Hereinafter, a second example is described with reference to FIGS. 3 and 4. A substrate cutting apparatus 200, as shown in FIG. 3, further includes another laser generator 40 to emit an infrared-based laser beam LB2 in addition to the laser generator 30. Hereinafter, the laser generator 30 is referred to as a first laser generator, and the laser generator 40 is referred to as a second laser generator. Further, the laser beam LB1 is referred to as a first laser beam, and the laser beam LB2 is referred to as a second laser beam.

The second laser beam LB2 emitted from the second laser generator 40 functions to previously heat part of the substrate 10 on the cutting line CL toward which the first laser beam OLB1 that is to be emitted from the first laser generator 30 and then to be beam-swung will move. A heating region (HA) heated by the second laser beam LB2 moves along the cutting line CL in the same manner as the irradiation section IS. Thus, the beam-swung UV-based first laser beam OLB1 cuts the substrate 10 heated by the infrared-based second laser beam LB2.

The second laser generator 40 that emits the infrared-based second laser beam LB2 may be, for example, a $CO_2$ laser, although aspects of the present invention are not limited thereto. The $CO_2$ laser can irradiate a laser beam of a wavelength of 10,600 nm. The laser beam having the wavelength of 10,600 nm is well absorbed into water molecules or hydroxy group materials, and it has high absorption for glass.

The substrate cutting apparatus 200 may further include an optical unit 45 to control the path of the second laser beam LB2 emitted from the second laser generator 40 and to condense the second laser beam LB2.

Figure 4:
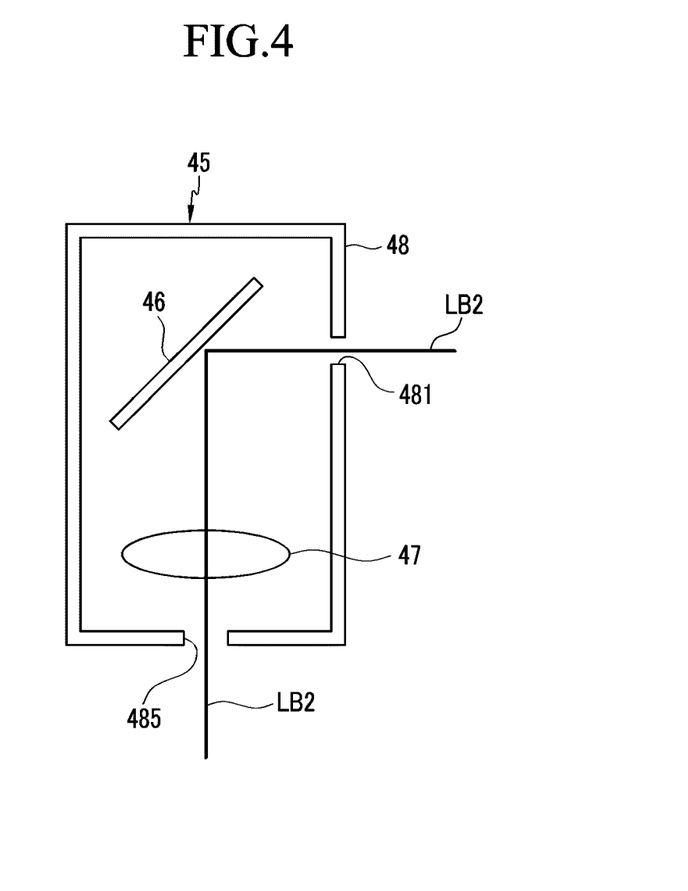
FIG. 4 is a schematic diagram of the optical unit of FIG. 3.

The optical unit 45, as shown in FIG. 4, includes a reflector 46 to control the path of the second laser beam LB2 and a condenser 47 to condense the second laser beam LB2. One or more of the reflector 46 and the condenser 47 of the optical unit 45 may be omitted according to a position of the second laser generator 40 and a direction where the second laser beam LB2 is emitted.

The optical unit 46 may further include a casing 48 accommodating the reflector 46 and the condenser 47. The casing 48 includes a beam inlet 481 to introduce the second laser beam LB2 that is emitted from the second laser generator 40 to the inside, and a beam outlet 485 to output the second laser beam LB2 toward the substrate 10 (refer to FIG. 3) via the reflector 46 and the condenser 47. However, the optical unit 45 is not limited to the structure shown in FIG. 4, and other structures may be employed. The substrate cutting apparatus 200 having the above construction can more stably cut the substrate 10.

If a crack resulting from heat impact occurs in a process of cutting the substrate 10 along the cutting line CL using the beam-swung first laser beam OLB1, the substrate cutting apparatus 200 can control a direction where the crack is formed so that the crack is generated along the cutting line CL. Since part of the substrate 10 according to the cutting line CL along which the first laser beam OLB1 will be irradiated is previously heated by the second laser beam LB2, a crack can be prevented from occurring in a direction intersecting the cutting line CL although the crack is generated when cutting the substrate 10 using the first laser beam OLB1. As described above, since a crack is guided into and formed along the cutting line CL through the second laser beam LB2, damage to the edges of an incision surface of the substrate 10 can be prevented. Accordingly, the substrate cutting apparatus 200 can stably use the beam-swung first laser beam OLB1 having a higher energy level.

Hereinafter, an experimental example and a comparative example are compared with each other and described with reference to FIGS. 5 and 6. In the experimental example, a substrate was cut using a beam-swung UV-based laser beam according to the first embodiment. In the comparative example, a substrate was cut using a general infrared-based laser beam that was not beam-swung.

Figure 5:
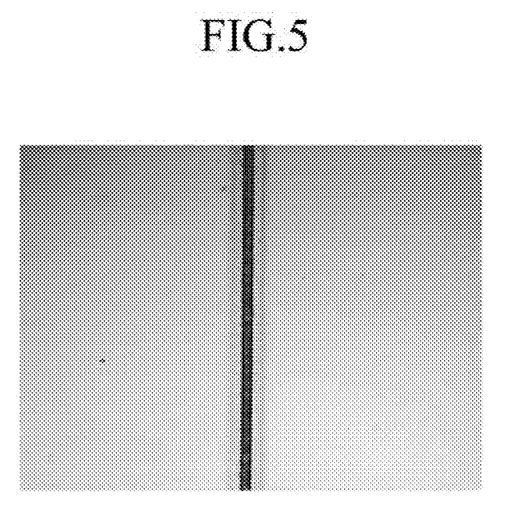
FIGS. 5 and 6 are top plan views showing incision surfaces of substrates that were cut according to an experimental example in accordance with an aspect of the invention, and according to a comparative example not according to an aspect of the invention.
Figure 6:
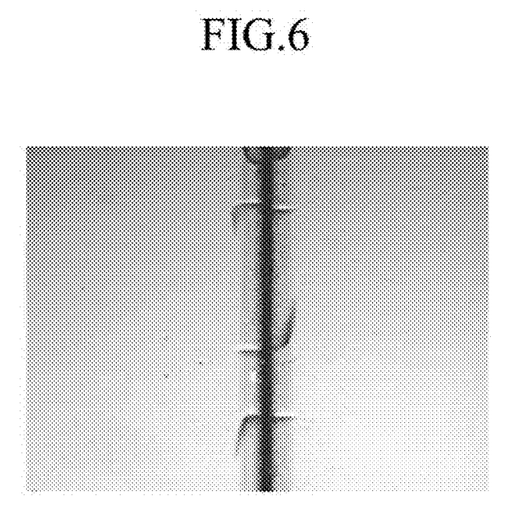

FIG. 5 shows a cutting line of the substrate cut according to the experimental example, and FIG. 6 shows a cutting line of the substrate cut according to the comparative example. From FIG. 5, it can be seen that the substrate cut according to the experimental example has a uniform and stable incision surface of the cutting line. On the other hand, from FIG. 6, it can be seen that the substrate cut according to the comparative example has a non-uniform incision surface of the cutting line and has many cracks at the edges (note the cracks emanating from the dark cutting line of FIG. 6.)

To cut a substrate that is several hundreds of micrometers in thickness and is used as the substrate of a flat panel display using a general UV-based laser beam that has not been beam-swung, a laser beam of a high energy level must be continuously irradiated on one spot region. A crack is generated by such a local heat impact. The crack is rarely controlled, and it can be randomly formed even in a direction intersecting a cutting line. If the edges of the substrate are damaged by the crack, the overall strength of the substrate is weakened.

If a substrate is cut using a UV-based laser beam that is beam-swung according to the first embodiment, a crack is not generated, so a stable cutting task can be performed. In accordance with aspects of the present invention, the substrate cutting apparatus can effectively and stably cut a glass substrate. Further, in accordance with the substrate cutting method according to aspects of the present invention, a glass substrate can be effectively and stably cut.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A substrate cutting apparatus, comprising:
   a stage to support a substrate;
   a laser generator to emit an ultraviolet (UV)-based laser beam to cut the substrate by removing part of the substrate along a cutting line of the substrate; and
   a beam oscillator disposed on a beam path of the laser beam, the beam oscillator being configured to oscillate a tilt angle of the laser beam toward the cutting line so as to perform a beam swing on the laser beam in a direction parallel to a length direction of the cutting line.

2. The substrate cutting apparatus of claim 1, wherein:
   the laser beam is subject to the beam swing within a predetermined beam irradiation section; and
   the beam irradiation section has a same length direction as the cutting line and is placed on the cutting line.

3. The substrate cutting apparatus of claim 2, wherein the laser beam has a wavelength of 200 nm to 900 nm.

4. The substrate cutting apparatus of claim 2, wherein the laser beam is a pulse laser beam.

5. The substrate cutting apparatus of claim 4, wherein the laser beam having the tilt angle oscillated by the beam oscillator physically removes the substrate within the beam irradiation section.

6. The substrate cutting apparatus of claim 4, wherein the laser beam has a unit irradiation time shorter than 50 ps (picoseconds).

7. The substrate cutting apparatus of claim 6, wherein the laser beam has a pulse frequency ranging from 0.1 MHz to 100 MHz.

8. The substrate cutting apparatus of claim 2, further comprising:
a transfer unit to transfer one or more of the beam oscillator and the stage in a direction parallel to the cutting line;
wherein the transfer unit moves the beam irradiation section along the cutting line.

9. The substrate cutting apparatus of claim 2, wherein the beam oscillator includes:
a reflector to reflect the laser beam emitted from the laser generator; and
a driver to drive the reflector.

10. The substrate cutting apparatus of claim 9, wherein the driver selectively controls a motion of the reflector so that a beam swing speed of the laser beam becomes uniform.

11. The substrate cutting apparatus of claim 1, further comprising a cleaning unit to clean a region of the cutting line cut by the laser beam.

12. The substrate cutting apparatus of claim 1, wherein the apparatus is configured to cut a substrate having a thickness of 0.3 mm or less and being made of a glass-based material.

13. The substrate cutting apparatus of claim 8, further comprising:
an additional laser generator to emit an additional laser beam, the additional laser generator being located to heat an uncut part of the substrate on the cutting line in advance of the beam irradiation section;
wherein the additional laser beam is an infrared-based laser beam.

14. A substrate cutting method, comprising:
mounting a substrate on a stage;
oscillating a tilt angle of a UV-based laser beam so as to beam-swing the laser beam along a cutting line of the substrate; and
irradiating the laser beam having the oscillating tilt angle along a length direction of the cutting line so as to cut the substrate along the cutting line.

15. The substrate cutting method of claim 14, wherein:
the laser beam is subject to the beam swing within a predetermined beam irradiation section; and
the beam irradiation section has a same length direction as the cutting line and is placed on the cutting line.

16. The substrate cutting method of claim 15, wherein the laser beam has a wavelength of 200 nm to 900 nm.

17. The substrate cutting method of claim 15, wherein the laser beam subject to the beam swing is a pulse laser beam and physically removes the substrate within the beam irradiation section.

18. The substrate cutting method of claim 17, wherein the laser beam has a unit irradiation time that is shorter than 50 ps (picoseconds) and a pulse frequency ranging from 0.1 MHz to 100 MHz.

19. The substrate cutting method of claim 15, further comprising:
transferring one or more of a beam oscillator and the stage along a direction parallel to the cutting line;
wherein the beam irradiation section moves along the cutting line when one or more of the beam oscillator and the stage are transferred.

20. The substrate cutting method of claim 19, further comprising:
irradiating an additional laser beam to the cutting line at a location of the cutting line in advance of the beam irradiation section moving along the cutting line so as to pre-heat the substrate at the location;
wherein the additional laser beam is an infrared-based laser beam.

* * * * *